W. E. HODGDON.
LIQUID DISPENSING APPARATUS.
APPLICATION FILED OCT. 15, 1908.
987,363.
Patented Mar. 21, 1911.
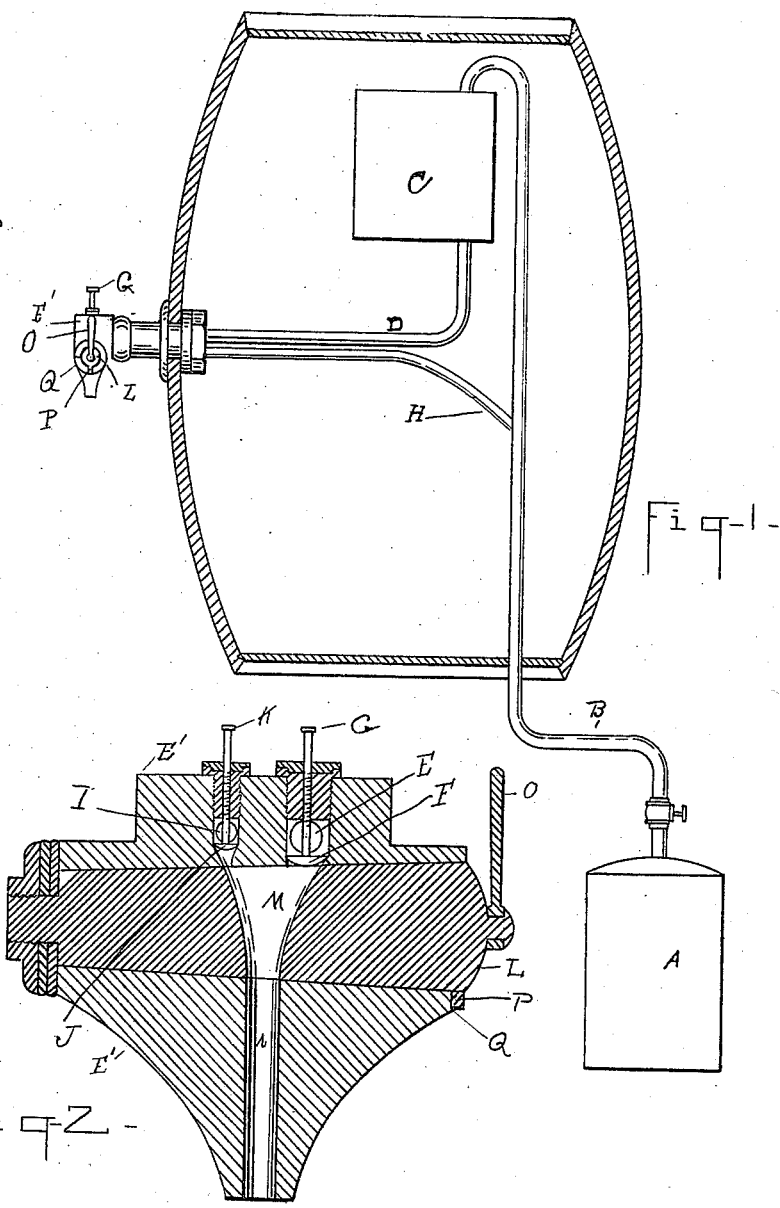

UNITED STATES PATENT OFFICE.

WALTER E. HODGDON, OF PORTLAND, MAINE.

LIQUID-DISPENSING APPARATUS.

987,363.  Specification of Letters Patent.  Patented Mar. 21, 1911.

Application filed October 15, 1908. Serial No. 457,776.

*To all whom it may concern:*

Be it known that I, WALTER E. HODGDON, a citizen of the United States, residing at Portland, in the county of Cumberland and State of Maine, have invented new and useful Improvements in Liquid-Dispensing Apparatus, of which the following is a specification.

My invention relates to improvements in apparatus for dispensing liquids, root beer for example, which are dispensed in a lively or partial lively condition due to their impregnation with gas. When in this condition it is impractical to dispense them alone directly from the container because it could thus only be drawn in a very frothy condition. For this reason it is customary to draw a still liquid and then liven it by projecting into it a stream of gas charged liquid. This is objectionable because it renders necessary two faucets and two operations. An example of an apparatus of this kind is that shown in Patent 854,412, issued May 21, 1907. The problem to be solved is to provide an apparatus where from a single faucet by a single operation a liquid may be dispensed in a livened condition. Applicant has solved the problem by providing an apparatus which mixes the still and live liquid in a faucet and providing means for regulating the proportions in which they are mixed.

My invention is specially designed to be used with root beer but may be used with other liquids wherever practical.

In the drawings herewith accompanying and making part of this application, Figure 1 is an elevation of my invention, the keg shown in section; and Fig. 2 is a vertical longitudinal sectional view through the faucet.

Same letters of reference refer to like parts.

In said drawings A represents a tank adapted to contain a gas charged liquid. Leading out of said tank is a pipe B adapted to discharge into a tank C, tank C being open and provided with a check valve, not shown, to automatically close the end of pipe B, when the liquid in the tank C has reached a predetermined height. It will be apparent that when the liquid is delivered into tank C it will become still or flat. Leading out of tank C is a delivery pipe D which connects with an opening E in the faucet casing E'. Opening E is provided with a valve F adapted to regulate the size of the delivery end of the opening. Valve F terminates outside the valve casing in a handle G. Pipe B is provided with a branch pipe H which also passes into the valve casing and connects with an opening I in the faucet casing. Opening I is provided with a valve J adapted to regulate the size of the delivery end of the opening. Valve J terminates outside in a handle K. Opening I is small relative to opening E. Fig. 2 shows the valve casing provided with inlet openings E and I entering the casing intermediate the ends thereof. These openings are adapted to be closed by valves F and J adapted to be turned up or down to regulate the size of the openings or to entirely close them, one being adapted to be used independently of the other. The drawing shows them seated so as to entirely close said openings. In the valve casing is a turn plug L provided with a tapering mixing chamber or opening M adapted to register when the valve is turned into the position shown with both of the openings E and I in the valve casing and also with a discharge opening N in the bottom of the valve casing. Valve L is provided with a handle O for operating the same and carries a stop P adapted to travel in a recess Q in the adjacent end of the valve casing, the recess amounting substantially to a quarter circumference of the end of the valve casing, said stop being adapted to limit the turning of the valve in the valve casing.

The operation of my improved device is as follows: The tank A is charged with gas charged liquid. Tank C receives therefrom gas charged liquid which after its delivery to the tank becomes still or flat. Pipes H and D respectively deliver live and still liquid which are brought together in valve L through openings I and E respectively in the valve casing, the still liquid being delivered in the larger volume and being impregnated with a smaller volume of live liquid through opening I, so that when valve L is opened, as shown in Fig. 2, a discharge of liquid properly livened results.

The advantage of my improved apparatus is that by a single turn of the faucet a discharge of live liquid is obtained, the proportions being regulated by valves J and F.

Having thus described my invention and its use I claim:—

In a liquid dispensing apparatus, a tank adapted to contain a gas charged liquid, a receptacle adapted to contain a flat liquid, a pipe leading from said tank to said receptacle, a branch pipe leading out of said pipe intermediate said tank and receptacle, a pipe leading out of said receptacle, a faucet comprising a valve casing provided with openings of unequal size spaced apart longitudinally of said casing, the larger adapted to receive liquid from said receptacle and the smaller to receive liquid from said tank, and with a discharge opening, a plug valve provided with a chamber extending transversely therethrough intermediate its ends, said valve being adapted to be turned so that said chamber will register with all of said openings simultaneously, and valves in said casing adapted to regulate the supply of liquid from said tank and said receptacle each independent of the other and independent of said plug valve.

In testimony whereof, I have signed my name to this specification in presence of two subscribing witnesses this twelfth day of October, 1908.

WALTER E. HODGDON.

In presence of—
CLARENCE E. CRISWELL,
J. M. HAMMOND.

---

Copies of this patent may be obtained for five cents each, by addressing the "Commissioner of Patents, Washington, D. C."